United States Patent
Kadlec (12)

(10) Patent No.: US 6,212,530 B1
(45) Date of Patent: Apr. 3, 2001

(54) METHOD AND APPARATUS BASED ON RELATIONAL DATABASE DESIGN TECHNIQUES SUPPORTING MODELING, ANALYSIS AND AUTOMATIC HYPERTEXT GENERATION FOR STRUCTURED DOCUMENT COLLECTIONS

(75) Inventor: Jaroslav Kadlec, Kirchheim (DE)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/076,373

(22) Filed: May 12, 1998

(51) Int. Cl.[7] ..................................................... G06F 17/30
(52) U.S. Cl. .......................... 707/201; 707/200; 707/102; 707/104
(58) Field of Search ................................... 707/200, 104, 707/102, 201

(56) References Cited

U.S. PATENT DOCUMENTS

| | | | |
|---|---|---|---|
| 5,233,513 | * | 8/1993 | Doyle ........................................ 705/7 |
| 5,615,112 | * | 3/1997 | Sheng et al. ........................... 707/104 |
| 5,822,745 | * | 10/1998 | Hekmatpour ............................. 706/59 |

OTHER PUBLICATIONS

"Process Flows", advertising brochure of Point Information Systems, Inc. (Jan. 1998).

"A Call to Profit: Turning Your Call Center into a Strategic Asset," *Fortune* (special advertising section), Feb. 2, 1998.

\* cited by examiner

*Primary Examiner*—Hosain T. Alam
*Assistant Examiner*—Jean M. Corrielus
(74) *Attorney, Agent, or Firm*—Hamilton, Brook, Smith & Reynolds, P.C.

(57) ABSTRACT

A computer method and apparatus for generating and maintaining a structured collection of documents describing a desired system is provided. A conceptual model of the desired system includes entities and relationships among the entities. An entity-relationship diagram is representative of the desired system. Documents are categorized and subsequently maintained with respect to the entities in the entity-relationship diagram. A hierarchy of process-message matrices is employed to determine the communications or dynamic exchanges of message entities in the modeled system and reflected in the entity-relationship diagram. A relational database implements the model and holds document contents (i.e., actual information) needed to automatically generate the collection of documents in a complete formatted manner for printing and/or compiling through word processing and/or compilation and linking means. The database further enables automatic hypertext generation by mapping interdependencies (relationships) between the entities into interdependencies (links) between the documents. One application of the invention automatically generates and maintains a collection of hypertext documents describing a business system.

17 Claims, 11 Drawing Sheets

FIG. 4A

High School Happenings     79

Workflow Procedure

Number: WP_0002     Revision: 0
Revision Date: 18-Mar-1997

Title: Excursion Ideas Community Suggesting

Author: !!! Missing !!!     Expiration Date: !!! Missing !!!
Approver: !!! Missing !!!     Approval Date: !!! Missing !!!

Description

This Workflow Procedure  45

Purpose

!!! Missing !!!

Context

!!! Missing !!!

- operation description of Business System

BS 0001    High School Happenings

- related to Service Agreement

None

Search Keywords

!!! Missing !!!

Details  78

!!! Missing !!!     47    49

- detailed by Work Activity / external Activity

WA 0004    Consolidate Travel & Price Info
     WA 0002    Evaluate Trip & Date Status
     WA 0012    Evaluate Yearly Trip Budget Status
     WA 0003    Prepare and Send Trip Proposal Request
     WA 0001    Receive and Process Trip Suggestion
     eA 0002    Receive Information and Act Accordingly
     WA 0011    Respond to Trip & Date Check
     eA 0003    Respond to Trip Proposal Request
     WA 0017    Respond to Yearly Trip Budget Check
     eA 0001    Submit Trip Suggestion
     WA 0016    SYS Store and Provide info

- executed in context of Business Process

BP 0005    High School Facilities  41e
     BP 0003    Student Self-Government  41c
     BP 0001    Yearly Excursion Support  41a

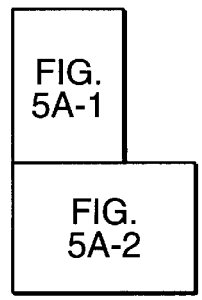

High School Happenings Number: WP_0002 Revision: 0
Excursion Ideas Community Suggesting

⟋79

Quality Records

!!! Missing !!!

Quality Criteria

!!! Missing !!!

Related Information

!!! Missing !!!

-pointing to Reference Document

RD 0001   High School Extracurriculum Activities

RD 0002   Travel Agency Discounts

Appendix

!!! Missing !!!

Change since last Revision   Last Change Date:   18-Mar-1997

New document - no previous Revision exists.

FIG. 5A-2

| FIG. 5B-1 | FIG. 5B-2 |

FIG. 5B

- operation description of Business System

High School Happenings

Number: WP_0002    Revision: 0

Excursion Ideas Community Suggesting

Excursion Ideas Community Suggesting

Workflow Table 77

| Pos | Source Pos | Work Activity / external Activity<br>Business Role / external Role<br>Business Message | Target Pos |
|---|---|---|---|
| 0 << | eA 0001<br>eR 0001 | Submit Trip Suggestion —49a<br>Requestor —53a<br>BM 0002  Trip Suggestion —55a | >> 1 |
| 1 << 0 | WA 0001<br>BR 0001 | Receive and Process Trip Suggestion—47a<br>Trip Coordinator —43a<br>BM 0005  Trip Suggestion Thanks } 55b<br>BM 0010  Trip & Date Check | >> 2<br>>> 3 |
| 2 << 1 | eA 0002<br>eR 0001 | Receive information and Act Accordingly —49b<br>Requestor —53b | >> |
| 3 << 1 | WA 0011<br>BR 0006 | Respond to Trip & Date Check—47b<br>Student Speaker —43b<br>BM 0020  Event Calender ACCESS } 55c<br>BM 0018  Yearly Trip Budget Check | >> 4<br>>> 5 |
| 4 << 3 | WA 0016<br>BR 0008 | SYS Store and Provide Info —47c<br>FILE & ARCHIVE SYSTEM —43c | >> |
| 5 << 3 | WA 0017<br>BR 0007 | Respond to Yearly Trip Budget Check—47d<br>Happenings Treasurer —43d<br>BM 0019  Yearly Trip Budget Status — 55d | >> 6 |

FIG. 5B-1

High School Happenings

Number: WP_0002      Revision: 0

Excursion Ideas Community Suggesting

---

6 << 5
    WA 0012    Evaluate Yearly Trip Budget Status —47e     77
    BR 0006    Student Speaker —43e
               BM 0008   Trip & Date Status —55e                       >> 7

---

7 << 6
    WA 0002    Evaluate Trip & Date Status —47f
    BR 0001    Trip Coordinator— 43f
    Trip & Date Status OK ?
        Yes
        No    BM 0001   >>NEXT>> — 55f                   >> 8
                                                                                                              >>

---

8 << 7
    WA 0003    Receive and Send Trip Proposal Request —47g
    BR 0001    Trip Coordinator—43g
               BM 0011   Reference Library ACCESS } 55g         >> 9
               BM 0006   Trip Proposal Request                       >> 10

---

9 << 8
    WA 0016    SYS Store and Provide info —47h
    BR 0011    REFERENCE LIBRARY —43h                                    >>

---

10 << 8
    eA 0003    Respond to Trip Proposal Request —49c
    eR 0002    Travel Agent —53c
               BM 0003   Travel & Price info —55h                     >> 11

---

11 << 10
    WA 0004    Consolidate Travel & Price Info —47i
    BR 0001    Trip Coordinator — 43i                                          >>

METHOD AND APPARATUS BASED ON RELATIONAL DATABASE DESIGN TECHNIQUES SUPPORTING MODELING, ANALYSIS AND AUTOMATIC HYPERTEXT GENERATION FOR STRUCTURED DOCUMENT COLLECTIONS

BACKGROUND

The reasons for the development effort behind the present invention are closely connected with the goals of TQM (Total Quality Management), especially with the need to support the following goals:

Customer satisfaction and trust to be achieved by a reliable, customer-oriented service at a competitive price/performance ratio.

Employee satisfaction and motivation to be a result of job transparency by formal task descriptions, clear communication channels and defined escalation procedures.

Organization productivity improvement to come from running streamlined operations with straightforward responsibilities, well-defined internal and external interfaces and centralized control of documentation.

Revenue growth and profit increase to be assisted by selling TQM services to external customers.

ISO9000 Registration to be obtained, based on innovative methods making one's TQM environment a show-case example.

One of the important aspects of so-called "Total Quality Management" is a good understanding of the business supplying products and services to customers. This understanding may be demonstrated and propagated into the day-to-day operation by user friendly, always up-to-date documentation of the particular Business Systems which sets definitions and standards for quality in terms of objective and measurable evaluation criteria. By continuously observing, evaluating and benchmarking the real business operation against the documented case, a steady improvement towards a desired zero fault operation may be gradually achieved. At the same time, the documentation may undergo changes based on new insights and desired improvements. The ultimate goal of such an incremental improvement process should be a simplified and transparent business operation demonstrably saving costs by avoiding errors and contributing to satisfaction of both customers and employees.

The real life complexity of business operations and the dynamics of omnipresent system changes present the main obstacle in the successful implementation of the above-specified goals. The traditional ways of documenting and distributing the business related information (handbooks, management directives, etc.) can hardly keep pace with the real life changes. In addition, it is very difficult to precisely document and maintain the detailed flow of information, and to provide consistent views of interrelated entities in an ad hoc manner. Consequently, a certain systematics of quality defining and efficiently supporting all necessary analysis and documentation steps (business operation/system modeling, information flow analysis and its simulation, structure of documents with their mutual relationships, documentation access, distribution, change control, etc.) must be established.

By considering the above requirements, one may arrive at the following problem statement: How to build up and maintain a user-friendly documentation of a business operation which supports a real and continuous quality improvement?

The traditional approach to create/maintain process-related and quality-related documentation is based on a more or less arbitrary set of templates. The templates are manually filled with information using document/text processing software. These documents may then be distributed either in a printable or electronic form, or made available on-line for download by the end user. In a more modern version of this approach, the documents may be converted to one of the Web formats and linked to a Web browser page, for example. In sum, the traditional approach is rather ad hoc, mostly manual and not systematic.

Another approach (sometimes used in connection with ISO9000 Registration) is to provide an integrated set of documents linked together by a predefined quality manual template. The quality manual template serves as the administrator's interface for the data entry. However, the terms of these documents are often ill-defined (or not well defined and ambiguous).

Restated, many definitions by the ISO8402 and ISO9000 Standards are imprecise and problematic for purposes of practical implementation of a quality system by most traditional approaches. For example, the ISO8402 and ISO9000 Standards define "Quality System" as the organizational structure, responsibilities, procedures, processes and resources for implementing quality management; and defines "Quality loop, quality spiral" as a conceptual model of interacting activities that influence the quality of a product or service in the various stages ranging from the identification of needs to the assessment of whether these needs have been satisfied. However, the ISO9000 Standard does not define the terms "process", "procedure", "activity" and "instruction".

As a consequence, it is difficult to establish a "conceptual model" of "interacting activities" which depends on the definition of "process", "procedure" and "activity", and which depends on the relationships of (i) "process" to organizational structure, (ii) process to business communication (information exchange) and (iii) "process" to "activities" and "instructions". Thus, there is an inconsequent and intermixing usage of these terms in traditional approaches (including the foregoing) and traditional process related documentation.

To this applicant's/inventor's knowledge, none of the current approaches takes an integral view of the documentation problem complexity. This means starting with the conceptual model of interacting activities (i.e., definition of all necessary terms and relationships among participating business related entities), implementing the model in a relational database and automation software which is capable of generating complete documentation with automatically maintained mutual cross-references, and providing a clear methodology to direct the information flow analysis and data collection steps, as in the present invention. Further details and description of the present invention are provided later.

In order to appreciate the major distinguishing features of the present invention approach in comparison with the traditional ways, one has to examine typical work during the life cycle of the resulting documentation. In particular, the steps of data acquisition, classification, and structuring, the phase of original documentation creation and its ongoing maintenance, as well as its presentation to the end user must be examined.

Data Acquisition, Classification and Structuring:

The traditional approach is mostly specifying the information items in an ad hoc manner, emphasizing the isolated point of view of the information provider; this generally applies to information item contents as well as its format. No (or little) consideration is given to the question of each information item's relationship to the surrounding information, possible contents overlapping and/or inconsistencies.

The present invention considers all information items in context of the established conceptual/relational model. Depending on the information item (i.e., entity instance) definition and its predefined entity relationships, the information provider is often directed to supply the specific contents only, without worrying much about its format. The redundancy and consistency problem is controlled by the documentation administrator using support of the powerful model and various provided tools. The Data Analysis Methodology of the present invention also proposes the right questions to ask during the data acquisition step, thus substantially improving the overall quality and conciseness of the resulting documentation. By accepting that the exchange of communication (i.e., information flow) is the controlling agent which uniquely defines the workflow of activities, the generation of workflow of arbitrary complexity may be fully automated by the present invention.

Documentation Creation and Maintenance:

The traditional approach assigns the responsibility to write and update complete documents to the information provider who, when consequently using established rules and well-designed templates, may be able to keep a certain internal consistency of format and presentation. However, because of the obviously limited view of and influence on the related surrounding information, contents overlapping and/or inconsistencies may still occur. The quality and usefulness of the resulting documentation strongly depend on the individual contributor, and the amount of analysis and maintenance work invested.

The present invention approach does not typically require the information provider to write complete documents; rather it collects clearly structured pieces of data from the individual contributor which serve as the database-resident building blocks in the automatic document composition step. A very important advantage of the present invention is the automatic handling of all links to the surrounding information which are kept in the database and extracted to the resulting documents. The documentation maintenance is monitored (e.g., expiration dates) and controlled by the documentation administrator.

End User Presentation:

The traditional approach to provide end user access to on-line documentation (Applicants disregard, for this comparison, the option of printed document distribution) is to manually create the end user interface structuring and listing the individual documents and supporting either on-line or off-line loading of the desired document. This may work well for a relatively static situation in which the structure and amount of documents do not change rapidly. For complex and highly dynamic information systems, however, the manual maintenance of the interface which must also support numerous relationships among various documents cannot cope with the problem at hand. As a result, even an originally consistent information system deteriorates over time and loses its usability.

The present invention approach delegates the creation of the end user interface to an automated mechanism which uses the structural information existing in the relational database. The preferred embodiment creates (a) the so-called Daily Operation Interface providing a simplified view of the documentation structure, and (b) the so-called Relational Navigator Interface supporting full access according to the relational model. Based on the actual database contents in the moment of the specific documentation release, a corresponding on-line interface is dynamically generated and made available.

SUMMARY OF THE INVENTION

The present invention provides a method and apparatus which define, develop and implement a systematic approach for the creation/maintenance/distribution of operation-related, management-related and quality-related information. In particular, the present invention takes an integral view of the above-discussed documentation problem complexity and includes the steps of (i) categorizing each document in the desired documentation collection as a respective class or type of entity, where the document collection characterizes/describes a modeled system (e.g., business operation, individual business process, computer/application system, etc.); (ii) charting or otherwise indicating the entities and their mutual dependencies in an entity-relationship diagram (i.e., associating entities by their mutual dependencies); and (iii) using the entity-relationship diagram to maintain the documents and hence generate and maintain the desired collection of documents.

In addition, for analysis and presentation of information exchange in the modeled system, a process-message matrix is employed to chart (indicate) exchange of the information-related entity.

A relational database may be designed according to the entity-relationship diagram and may be filled with actual information contents needed to automatically generate the complete formatted documents, both in printable and compilable form. In turn, the generated documents may be post-processed into the on-line hypertext version of the document collection using release, composer and compiler software (and a periodic documentation release mechanism).

In the preferred embodiment, the present invention maintains a collection of documents describing a business system. The invention (i) categorizes or otherwise classifies each document as a respective business related entity, (ii) forms a conceptual model of interacting activities (i.e., definition of all necessary terms and relationships among participating business related entities and hence in entity-relationship association); and (iii) implements the model in a relational database and with automation software which is capable of generating complete documentation with automatically maintained (hypertext) mutual cross-references. In addition, the preferred embodiment provides a clear methodology to direct the information flow analysis and data collection steps.

According to one aspect of the present invention, the major business-oriented benefits of the preferred embodiment are:

Support of Daily Operation

Support of Employee Training

Support of Management Decisions

Support of ISO9000 Registration

These benefits are enabled by utilization of process related information for a given business operation describing and mutually relating the following topics:

business operation structure in terms of organization-related processes roles people or systems/utilities are playing within the business operation external roles interfacing with the business operation business operation structure in terms of workflow related procedures details of procedures in terms of activities and their work instructions qualification requirements for people and functional requirements for systems/utilities agreed standards for information exchange among roles and/or external roles agreed standards for services provided to other business operations forms and checklists used in the business operation access to related information communication exchange within the business operation and with other business operations.

In accordance with another aspect of the present invention, the above topics are structured and interlinked according to the so-called relational model (Business System Model discussed later) and preferably presented in three complementary documents:

Quality Management Handbook (QMH) provides a general overview of the quality system by addressing the quality elements specified in ISO 9000 standard and cross-referencing the other two documents below Business System Documentation (BSD) is a detailed, event-driven, information-flow-oriented description of the business operation Process-Message Matrix (PMM) shows the formalized results of the information flow analysis and emphasizes the communication exchange interfaces.

Based on the third document set (i.e., PMM) which is created during the original information flow analysis phase (and then extended by additional data and descriptions), a relational database mapping the assumed Business System Model is populated. All further steps leading to the on-line hypertext documentation as well as a set of printable documents are fully automated. The end user may access the on-line hypertext documentation from a PC Desktop, either by clicking a Desktop icon or via a web browser page. The current technical implementation of the preferred embodiment is based on an integrated set of Microsoft PC-based applications. However, it is understood that the disclosed approach/invention is rather generic and may be implemented using other software applications or other technologies as well.

Thus it is an object of the present invention to provide an innovative approach to design a quality system supported by a consistent, on-line, hypertext documentation.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views.

FIGS. 4a–4d are illustrations of process-message matrices utilized in forming the original information flow analysis among entities of FIG. 3.

FIGS. 5a1, 5a2, 5b1 and 5b2 are graphical illustrations of Workflow Procedure entity documents including a workflow table in the Business System Model of FIG. 3.

DETAILED DESCRIPTION OF THE PREFERRED EMBODIMENT

Key to the present invention are the following concepts:

I. Any collection of documents describing related "things of interest" which may be organized and/or assigned to specific classes (categories) of entities (such as Business Process, Service Agreement or Check List), may be conveniently described by a so-called entity-relationship diagram. Such a diagram is a traditional tool in the design of relational databases and represents all entities within the scope under consideration. In the present invention, a relational database is designed according to the entity-relationship diagram and is filled with actual information contents needed to automatically generate the complete formatted documents, both in printable and compilable form, which in turn may be post-processed into an on-line hypertext documentation. It is this concept of applying the techniques and tools known from traditional relational database design to a structured collection of documents which is key to the present invention.

II. The above approach (in I.) is uniquely suitable to create and easily maintain complex collections of related documents in a generic hypertext system. Thus, a second key concept of the present invention is the mapping of links between the entity instances within the relational database into the links between the related documents in the hypertext environment. That is, in a collection or set of documents (or other information structure), there are many links between interdependent documents (information structures). The present invention relational database provides the chain or sequence of links to propagate a change in each affected document (information structure), upon the administrator-user entering the change one time (i.e., in one place in the database).

III. To support an original information flow analysis and formalization of its results, a Process-Message Matrix formalism may provide a flexible charting of communication exchange between entities. Such a hierarchical matrix formalism is generally applicable whenever various instances of one or more entities are establishing their mutual relationships via exchange (i.e., sending and receiving) of another entity (e.g., a message entity).

Figure 1:
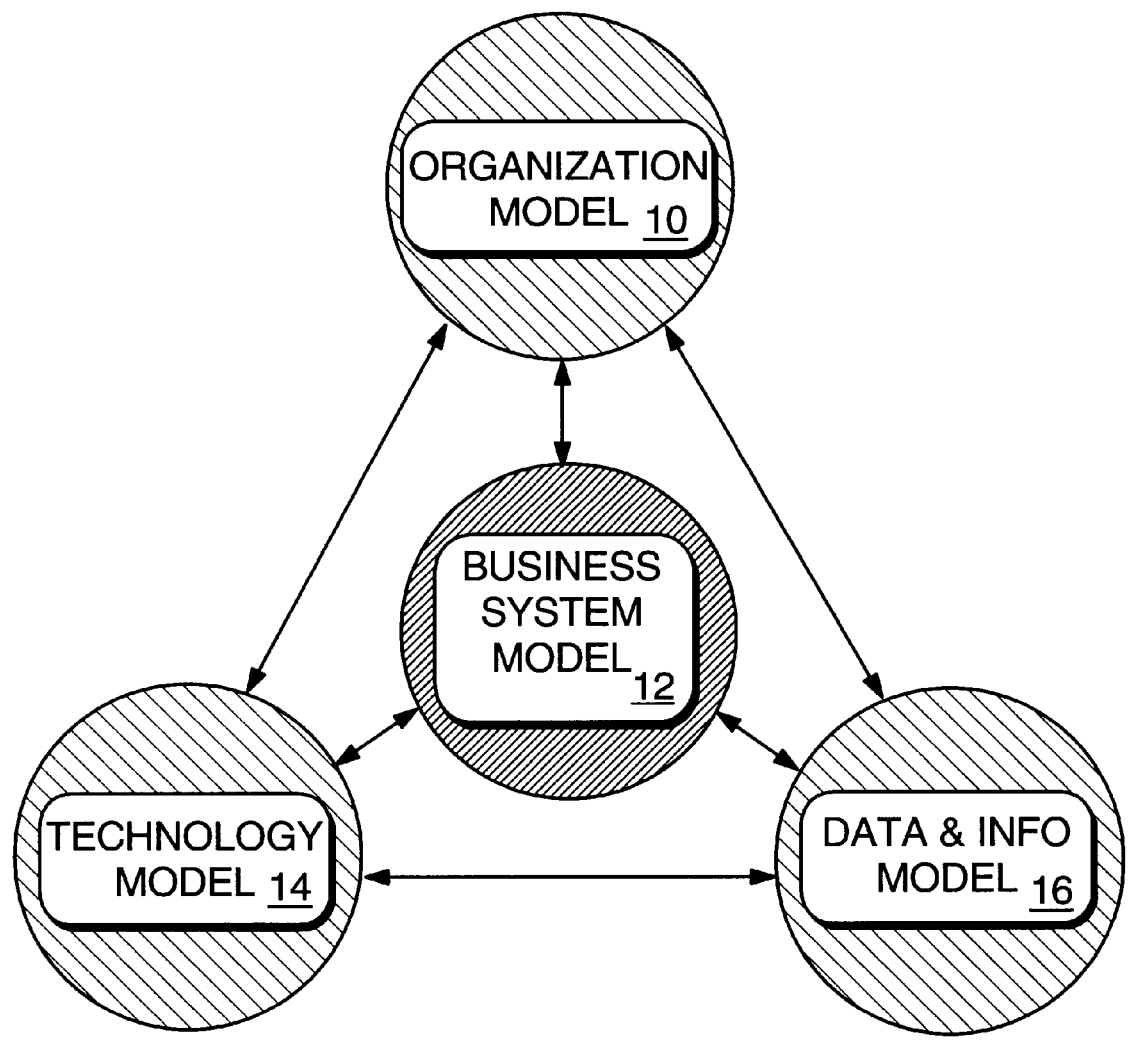
FIG. 1 is a schematic overview of a Business System Model utilized in the preferred embodiment of the present invention method and apparatus.

In the preferred embodiment, these concepts are applied to the business/enterprise environment as follows:

By way of overview, in terms of enterprise modeling, any business operation exists at the crossroads of three models, as a so-called "Business System Model" 12 shown in FIG. 1. An Organization Model 10 represents the organizational, administrative and legal structures of a subject company and, in the context of Business System Documentation (BSD), emphasizes the human resources supporting or controlling the business operation.

A Data and Information Model 16 represents the data and information structures of the company and, in the context of BSD, emphasizes the information flow and interaction of business related information.

A Technology Model 14 represents the technical infrastructure of the company and, in the context of BSD, emphasizes the technical capabilities (hardware and software platforms, networks, printing) for collecting, formalizing, distributing and maintaining the business related information.

One objective of a relational BSD environment (or approach) provided by the present invention specifies the need to facilitate a clear correspondence to all enterprise models 10, 14, 15. The present invention Business System Model 12 definition is thus formulated in such a way as to allow an easy mapping between its own BSD entities and the entities of the surrounding enterprise models 10, 14, 16.

The usability of any model depends on its ability to mirror the real-life situation while, at the same time, moving its complexities to an abstraction level with just a right amount of detail. The goal of the present invention is to efficiently support the day-to-day business operation including its optimization and gradual improvement.

A second objective of the present invention specifies the need for a sufficient level of details. The invention Business System Model 12 definition thus reflects the actual information flow and data exchange between various parts of the business operation and provides detailed enough descriptions for the work to be reliably and reproducibly done. The resulting workflow is then an obvious consequence of actions responding to the information flow triggers. In addition, the most important frequently used business related information appears as an integral part of the documentation environment in the present invention.

There are many separate tools (in the prior art) for writing, managing and distributing documentation which provide high functionality features and also support data sharing. Unfortunately, using these tools without an interconnecting methodological principle and automated supporting software environment cannot cope with the complex problem at hand, simply because of the amount of information, the necessity to maintain numerous relationships, and the high rate of information change. By using the prior art tools alone, the quality and usefulness of the resulting documentation strongly depend on the individual documentation administrator, his/her sophistication and the amount of analysis and maintenance work invested. Therefore, a definition and software support of documentation life cycle is required.

A third objective of the present invention specifies the need for a documentation methodology and supporting environment. The present invention Business System Model 13 definition is thus seamlessly integrated into the process of collecting and analyzing business related information, the formalization and entry into the supporting tools and the transformation into a user-friendly documentation. In the present invention, the documentation structure, including mutual relationships between document types and their possible interaction with the information flow, is specified as part of the supporting environment which must promote consistency of information contents and presentation, and allows rapid updates resulting in a new release of up-to-date documentation.

In view of the often experienced frequent upheavals of the Organization Model 10 and possible future modifications of both the Data and Information Model 16 and Technology Model 14, a great deal of flexibility and independence of the surrounding models is desired. The speed of documenting and propagating such changes down to the end user is instrumental to the acceptance and success of the proposed approach. The same kind of (planned or unplanned) changes may pose a question to the management about their potential impact on running the business operation; the answers should be facilitated by the appropriate definition and presentation of communication interfaces.

The fourth objective of the present invention specifies the need for flexibility and a process oriented view. The invention Business System Model 12 thus allows not only fast business data entry and their semi-automated controlled release to the end user, but also the option of changing itself in terms of its data structures and/or customized language. The links to external organization and data structures are readily modifiable. A process oriented (as opposed to an organization-oriented) structure of descriptions is used to increase the data stability in case of changes in the surroundings. The optimization of the business operation design is supported by the presentation of information flow and business related information.

There are three major practical benefits of documenting the business related information:

The formal task descriptions which are provided to the end users within the business operation define in unequivocal terms the work to be done and the metrics to judge the success or failure. This promotes the work quality and reliability as well as the employee satisfaction.

The relationship between the task descriptions and the information flows helps management to get the overall view of the business operation including its various workflows. This is the necessary basis for work optimization and low-risk change management.

The capability to demonstrate a documented business operation to customers supports their trust in the reliability of the provided products and services, and together with the resulting ISO9000 Registration, provides a competitive edge in the marketplace.

The fifth objective of the present invention specifies the need for accessibility, understandability and conformance to ISO9000 in the preferred embodiment. The invention Business System Model 12 definition must result in a user-friendly version-controlled documentation which can be easily distributed. The documentation structure corresponds and is detailed down to the task description of a particular end user who is accomplishing the work; it is also clearly related to the incoming and outgoing information flow. The resulting document is compatible with the ISO9000 standard and, in conjunction with the related Quality Management Handbook, leads to the ISO9000 Registration.

Based on the foregoing Business System Model 12 definition objectives, the present invention implements a Relational Business System Documentation Environment (Relational BSD Environment) as follows and illustrated in FIG. 2.

In general, the Relational BSD Environment implementation follows the below design principles set forth in two categories—environment design and operation analysis.

Figure 2:
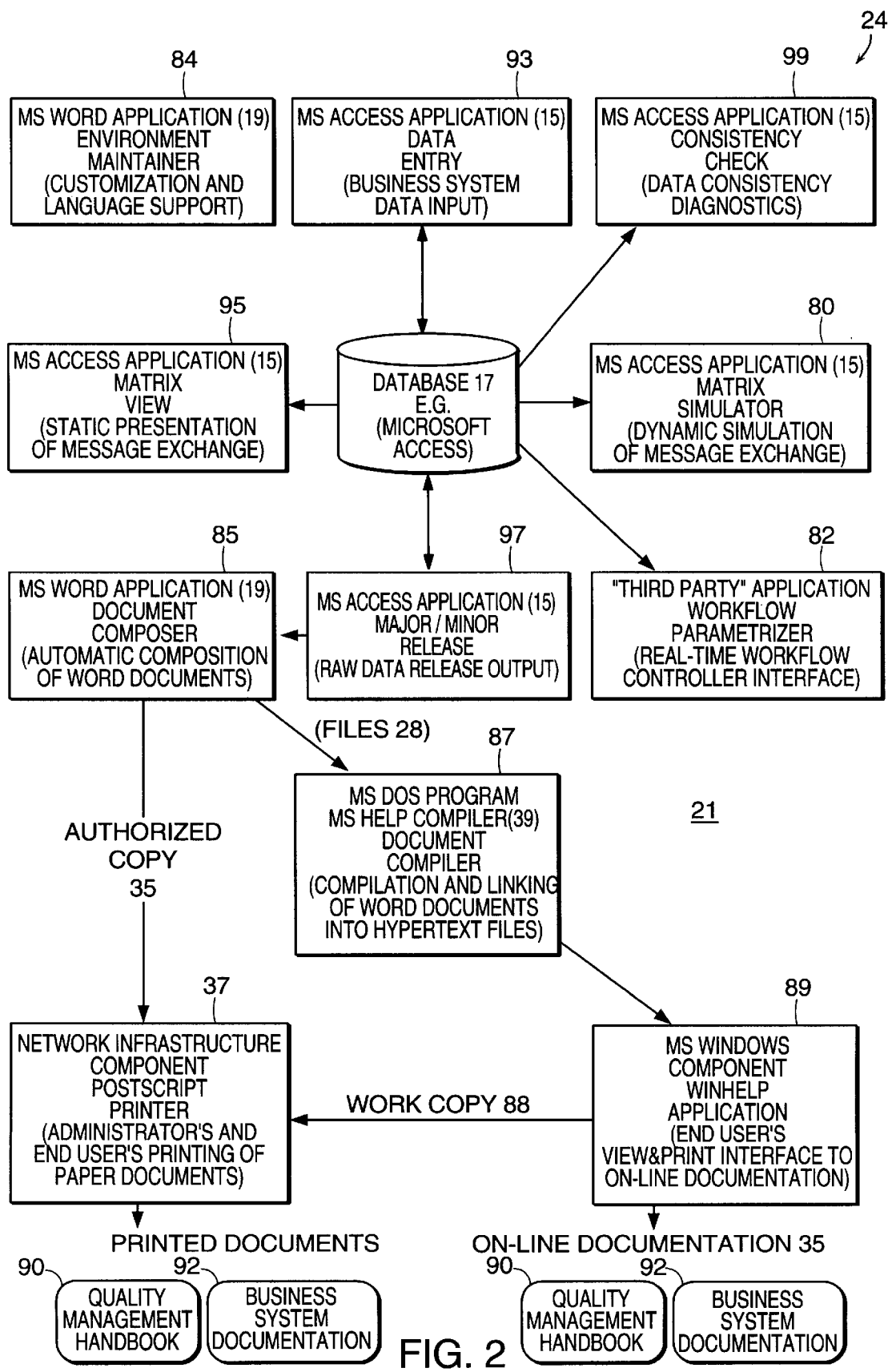
FIG. 2 is a software architecture diagram of the preferred embodiment of the present invention.

Environment Design Principles:

The invention software 24 for Relational BSD Environment is implemented using standard PC products running under MS Windows (MS Access 15, MS Word 19, MS Help Compiler 39, MS WinHelp 89) as illustrated in FIG. 2. The finished environment is then able to be ported to Windows 95 and Windows NT.

The process oriented, generic relational model 12 of a Business System is described by an overview diagram 13 (discussed later in FIG. 3) using the proven technique of entity-relationship modeling.

Figure 3:
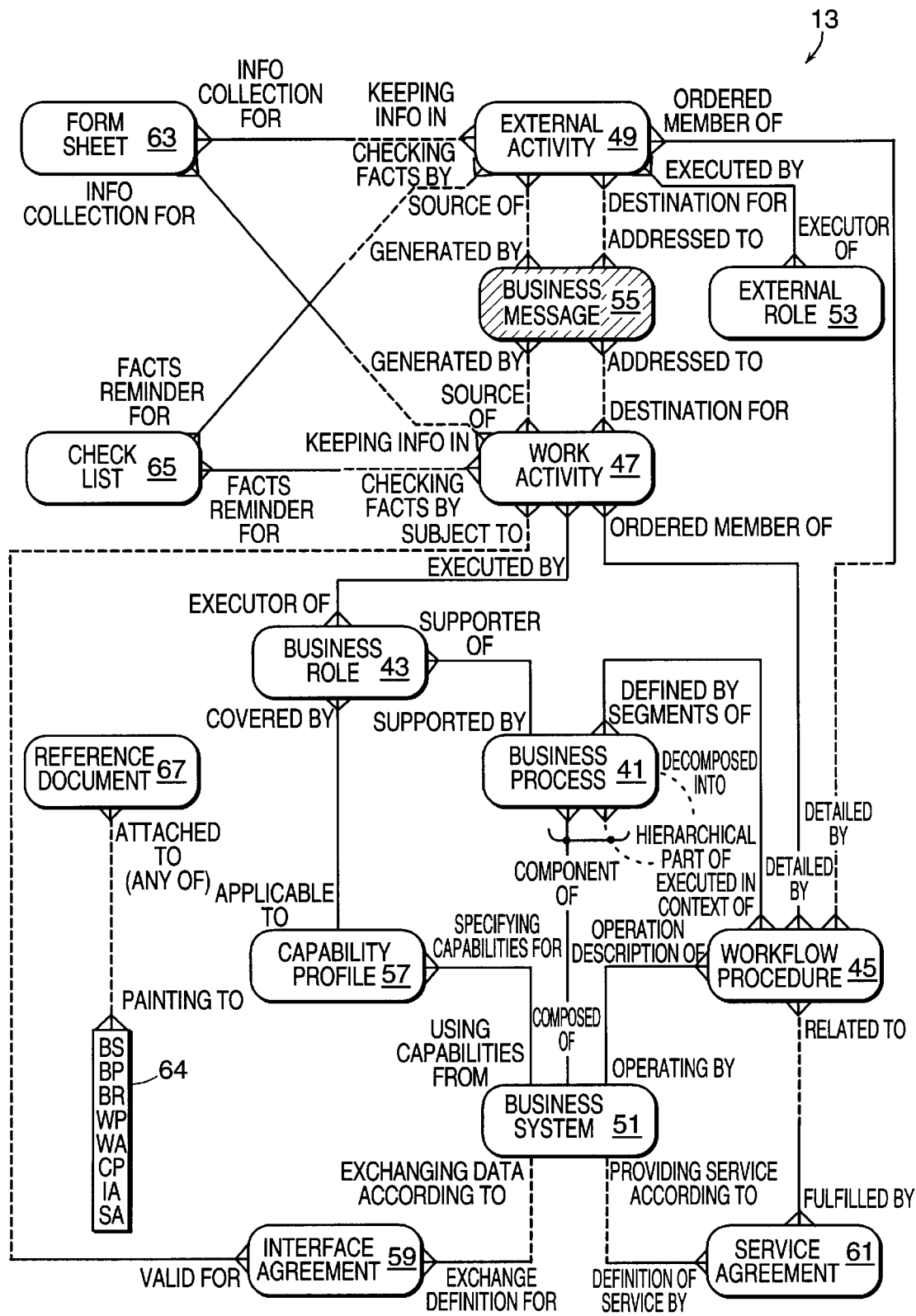
FIG. 3 is a schematic illustration of an entity-relationship diagram of entities in an example Business System Model, utilized to form the database in FIG. 2.

The relational database 17 is designed in MS Access 15 by the standard mapping of entities, attributes and relationships from the overview diagram 13 (FIG. 3). Included is a high-functionality administrator's interface and documentation raw data release extraction mechanism 97.

The automatic document composition 85 is implemented using MS Word 19 programming capabilities. The automatic document composition 85 integrates the customized language of the environment with the raw data extracted from the relational database 17 and produces compilable source documents and, in parallel, a consistent set of printable documentation.

The MS Help Compiler 39 runs under control of a MS DOS batch file 87 and produces a set of standard MS Windows (hypertext) help files which are displayable on any PC using MS WinHelp application 89 (available on MS Windows, Windows 95 and Windows NT). The end user accesses the on-line information 35 from the PC Desktop, either by clicking a Desktop icon or via a World Wide Web browser page.

Operation Analysis Principles:

The live data collection for the invention Relational BSD Environment starts with a bottom-up, event-driven, information-flow-oriented analysis based on a familiar process-message diagonal matrix 71 (discussed later in FIG. 4). The original matrix approach is extended to accommodate matrix hierarchies and a clear definition of internal/ external communication interfaces in the present invention.

The information collected in process-message matrices 71 (FIG. 4) determines all basic entity instances of the subject business operation/Business System Model 12, including the detailed information flow. This data is entered 93 (via MS Access 15) by a documentation administrator into the database 17 and completed by appropriate descriptions. All related entities (as determined by the overview diagram 13 FIG. 3) are found, associated and entered as well in data entry step 93 of FIG. 2.

The raw data release 97 from MS Access 15, document composition 85 in MS Word 19 and document compilation 87 in MS DOS are the finishing fully automated steps; a new documentation release 35, 88 (including for example in the preferred embodiment a Quality Management Handbook 90 and the Business System Documentation 92) is then ready to use (on-line and/or in hard copy via a printer 37).

Referring to FIG. 3, the entities of the Business System Model 12 including their mutual relationships are shown in diagram 13 format. The process oriented, generic relational model diagram 13 is next described in terms of its structure and its contents.

The model diagram structure is determined by the definition and relationships of so-called "basic entities", which in theory cannot be omitted or substantially modified in their significance without changing the philosophy of the modeling approach at the same time. So-called "supporting entities" supplement the basic structure by additional characteristics and information.

In the preferred embodiment, the basic entities include the Business System 51, Business Process 41, Business Role 43, external Role 53, Workflow Procedure 45, Work Activity 47, external Activity 49 and Business Message 55 portions (entities) of the model. The supporting entities include a Capability Profile 57, Interface Agreement 59, Service Agreement 61, Form Sheet 63, Check List 65 and Reference Document 67 portions/entities of FIG. 3.

The entities Business System 51, Business Process 41 (with its optional sub-processes), Business Role 43 and external Role 53 are used to represent how the company/ enterprise is organized (i.e., represent the basic organization-related structure of the model 12 definition). In particular, each business operation of the company is represented by a Business System entity 51. Each Business System entity 51 in turn is formed of one or more (possibly hierarchical) Business Processes 41. In terms of workflow, each Business System 51 operates by workflow procedures represented by Workflow Procedure entities 45. In turn, a Workflow Procedure 45 is executed in the context of one or more Business Processes 41 and is detailed by one or more Work Activities 47 (i.e., represented by Work Activities entities 47 and external Activity entities 49 respectively). The Work Activities 47 of a Workflow Procedure 45 are ordered. Likewise, the external Activities 49 of a Workflow Procedure 45 are ordered, in the preferred embodiment.

In the hierarchy of Business Processes 41, each Business Process entity 41 may be decomposed into one or more child or sub-Business Processes. In terms of workflow, each Business Process 41 is defined by segments of the corresponding Workflow Procedures 45 (that is, the Workflow Procedures 45 of the Business System 51 comprising the Business Process 41). In terms of humans or utilities involved, each Business Process 41 is supported by a respective set of Business Roles 43. In turn, a Business Role 43 is the executor of a corresponding set of Work Activities 47, (which, as set forth above, is an ordered member of a Workflow Procedure 45).

The Work Activity entity 47 is the lowest level entity in the model diagram 13 and provides a description of the actual subject work, action or other activity. The internal actions are specified in detail by work instructions and may be of arbitrary complexity. Each Work Activity 47 and external Activity 49 is executed by a Business Role 43 and external Role 53 respectively, in response to input Business Messages 55. That is, a Business Role 43 (external Role 53) executes a Work Activity 47 (external Activity 49) which generates a Business Message 55 addressed to another Work Activity 47 or external Activity 49, to be executed by a respective Business Role 43 or external Role 53 respectively. Thus, each Business Message entity 55 is any formally established communication generated by a source Work Activity 47 or external Activity 49, and addressed to a destination Work Activity 47 or external Activity 49.

In sum, the entities Workflow Procedure 45, Work Activity 47 and external Activity 49 represent the basic workflow related pieces of Business System Model 12/model diagram 13. At the same time, the Work Activity entity 47 is the connecting element between the organization-related and the workflow related structures since a Work Activity 47 is executed by a Business Role 43. The Business Message entity 55 is the driving agent of the model definition dynamics by the means of a one-by-one communication among Work Activity entities 47.

As an example of the foregoing, the total business operation under consideration may be, for instance Information Services of a company. This would be represented by or correspond to a top-level Business System entity 51. The example Information Services' main service functions, say, for example, End User Support, Computer System Administration, Technical Planning, etc., correspond to various Business Process entities 41. Further, the roles that people or systems/utilities are playing within a particular Business Process 41 (say Hotline, Escalation Manager, Automatic Monitoring Utility, etc., of the company) correspond to various Business Role entities 43. The external Role 53 is analogous to a Business Role 43, but belongs to the surroundings of the business operation/Business System 51 under consideration.

Thus, the Work Activity 47 (say, Respond to User Call) at Hotline Business Role 43 responding to phone calls may receive a Business Message 55 (say, User Call) containing an unusual request. In response, Hotline Business role 43 Work Activity 47 involves the Escalation Manager (another Business Role 43) by sending to the Escalation Manager Business Role 43 a Business Message 55 (say, Resolve Unusual Request) which asks to resolve the problem. In turn, a Work Activity 47 (say, Decide on Unusual Request) of Escalation Manager Business Role 43 reacts to the received communication (i.e., Business Message Resolve Unusual Request) by evaluating the problem and making a proper decision.

As can be seen/understood by the foregoing example and discussion of FIG. 3, a complete and consistent exchange of Business Message entities 55 uniquely defines a particular workflow which is represented by a workflow table in the corresponding Workflow Procedure entity 45. External Activities 49 are modeled analogously to work Activity entities 47 in meaning, but belong to the surroundings (and not internals) of the business operation under consideration.

Further, in order to examine detailed communications between the roles (i.e., Business Roles 43 and external Roles 53 in any combination), the preferred embodiment formally charts these communications before representing them in the System Model 13. That is, process-message matrices 71 as illustrated in FIG. 4 (and discussed later) are employed to chart the various communications at study. These matrices provide the necessary workflow information for entry into the System Model 13 and ultimately the relational database 17.

In short, the information collected in the process-message matrices 71 determines all basic entity instances and detailed information flow of the system model diagram 13 (FIG. 3). It is this data which is entered into the database 17 by an administrator-user and completed by appropriate descriptions.

Continuing to refer to FIG. 3, the supporting/ supplemental entities are discussed next. The Capability Profile entity 57 specifies capabilities for the Business System 51 under consideration. The Capability Profile 57 is applicable to a Business Role 43. As such, the Capability Profile 57 enables simplification of writing job descriptions, functional specifications of utilities, employee development and training requirements, etc.

The Interface Agreement entity 59 and the Service Agreement entity 61 represent, respectively, the technical and the contractual interaction with surroundings of the business operation (represented by Business System 51) under consideration. In particular, the Interface Agreement entity 59 defines data exchange for the related Business System 51 and is valid for a particular Work Activity 47. The Service Agreement entity 61 provides a definition of the service by the business operation under consideration (corresponding Business System 51) and is fulfilled by corresponding Workflow Procedures 45 of the respective Business System 51.

The Form Sheet and Check List entities 63, 65 represent work documents for a Work Activity 47 or an external Activity 49. That is, the Form Sheet 63 contains information for a particular Work Activity 47 and/or for a particular external Activity 49. The Check List 65 outlines facts indicative of an external Activity 49 and/or Work Activity 47.

The Reference Document entity 67 allows an integrated view of additional reference information, either by directly providing display of the document or by supplying the necessary pointers. The Reference Document 67 is thus attached to any number of supplemental references 69.

In the preferred implementation of the present invention, the above-described entities have a set of attributes providing information about the entity instance. The values of these attributes are stored in the relational database 17, either as text or relationship (i.e., a pointer to another entity). They are extracted at the time of document generation and included in the final documents by the word processing application 19. The model diagram 13 definition classifies these attribute associations as "common" and "additional"; apart from the attributes, some entities have supporting attachments.

In the preferred embodiment, each entity of the system model diagram 13 of FIG. 3 is characterized by information provided by a set of common attributes. The set of common attributes include an Identification Number for uniquely identifying the entity instance, a corresponding Title, Author and Approver of the entity instance. Other attributes in the set include a Description, Purpose and Context of the entity, along with Search Keywords and Details. Also there are attributes for providing an indication of Change since the last Revision, the Last Change Date, a Revision Identifier Number (or other indications of the revision) and Revision Date. Further included are the attributes of Expiration Date and Approval Date.

The entities Business System 51 and Business Process 41 have in addition to the above-mentioned common attributes the following five attributes:

Owner

Related Information

Quality Criteria

Quality Records

Appendix

The entities Business Role 43, Workflow Procedure 45 and Work Activity 47 have four additional attributes (i.e., in addition to the above-described set of common attributes). The additional attributes are Related Information, Quality Criteria, Quality Records and Appendix.

The entities Capability Profile 57, Interface Agreement 59 and Service Agreement 61 have an additional attribute of Related Information.

The entities Workflow Procedure 45, Work Activity 47, Capability Profile 57, Interface Agreement 59, Service Agreement 61, Check List 65, Form Sheet 63 and Reference Document 67 have attachments. Attachments are separate files which are directly displayed at the end of the entity document. For example, a workflow table 77 (FIGS. 5b1 and 5b2) is an attachment to Workflow Procedure entities 45 respective document, discussed later. In the attachments of entities 45, 47, 57, 59, 61, 65, 63 and 67, any needed information may be provided. Typically work documents for an activity such as Form Sheet 63 or Check List 65 may be made available on-line and be integrated within the Business System Documentation 92 (FIG. 2).

It is understood that for each instance of entities Business Role 43, Workflow Procedure 45, Work Activity 47, Capability Profile 57, Interface Agreement 59, Service Agreement 61, Check List 65, Form Sheet 63 and Reference Documents 67, the database 17 stores data corresponding to the respective attributes (common and additional) discussed above. Use of these fields of data (i.e., references thereto) in the present invention system 24 of FIG. 2 is illustrated by the following example "High School Happenings", a hypothetical business operation.

The "High School Happenings" hypothetical business operation consists of five relatively autonomous Business Processes 41a,b,c,d,e which have been respectively assigned the names "Yearly Excursion Support", "Party & Fun Support", "Student Self-Government", "High School Administration" and "High School Facilities". The name selection for these processes 41 are indicative of respective activity or role in the business operation. The main focus of this discussion is on "Yearly Excursion Support" 41a which has been assigned the top priority. Other processes 41b–41e are considered only insofar as needed in the defined workflows. The documentation illustrated in FIGS. 5a1, 5a2, 5b1 and 5b2 should be seen as work in progress, with some entities finished or nearly finished; some entities are just defined but not actually completed with specific information.

Examination of the entity documents pointed to from any particular index reveals the way information is presented. Besides text values for all common and additional attributes defined for the entity, all relationships to the related entities are shown. Preferably headings of the relationship and text are displayed first, followed by either the word None (if no corresponding related entities exist) or by a display of the entity identification and name. In the "High School Happenings" example, the entity document 79 for a Workflow Procedure 45 executed in the context of the mentioned example Business Processes 41 is illustrated in FIG. 5a1. That entity document 79 includes in its Details section 78 a heading composed of Business Process under which the related (above mentioned) processes 41 a, c and e are shown in alphabetical order.

Relationships may appear in various places of the entity document, depending on their significance. Typically, the related entities may provide more detailed information to the examined entity document and then they appear listed in the Details section, or the examined entity document may be seen in the context of the related entities and then they appear listed in the Context section. A Business Message 55 is considered to be part of the Description section for activities, while a Reference Document is part of the Related Information section.

Continuing with the "High School Happenings" example, each of the Business Process entities 41 is further detailed into one or more Business Role entities 43. A Business Role 43 is mostly the role a person is playing in the business operation, but it also may correspond to a role of a system utility, application or any other expedient non-personal object or agent. The roles outside of the scope of the considered business operation are called external Role entities 53; they provide the external side of the human/utility interface with the surroundings.

Each role may perform certain work consisting of arbitrarily small or big pieces, each of them being defined by a Work Activity 47 or an external Activity 49 with the same meaning of the word "external" as above. An important criterion to structure an operation task into one or more activities is the incoming and outgoing communication. Basically, an activity is either triggered by formal communication or starts according to an internal schedule, then executes autonomously without a formal information exchange, and may conclude by formal communication to other activities. This communication is carried by Business Message entities 55.

Workflow Representation

The notion of a workflow (also called value chain procedure or simply procedure) which connects separate operation tasks into a continuous networked sequence (allowing re-entry, looping, feedback, etc.) and fulfil a particular business purpose (e.g., Trip Proposal Review and Planning) is supported by the entity Workflow Procedure 45. At the beginning of the workflow in each Workflow Procedure 45 is a Work Activity 47 which is either triggered by a Business Message 55 coming from an immediately preceding external Activity 49 or starts by itself according to an internal schedule. Since each business operation has a limited number of these external message or internal schedule events, there is a limited number of Workflow Procedure entities 45, each of them corresponding to one and only one of the triggered or scheduled activities.

The following explanation deals with the workflow table 77 of the present invention which is automatically created and integrated as an attachment to each Workflow Procedure entity 45 document such as entity document 79 illustrated in FIGS. 5a1 and 5a2. FIGS. 5b1 and 5b2 illustrates an example corresponding workflow table 77. The workflow table 77 represents a detailed description of the workflow and must be read and interpreted in the following way:

The left-most column entitled "Pos" identifies uniquely the current position in the table 77 and shows after the symbol << the Source Pos, the position the input communication is coming from. Similarly, the right-most column indicates after the symbol >> the Target Pos, the position the output communication is going to.

The contents of each "Pos" is either the pair Work Activity 47 of a Business Role 43 or the pair external Activity 49 of an External Role 53, followed by the (possibly) annotated line(s) of outgoing communication shown as a Business Message 55. Since these entries provide both, a brief description of the entity as well as a full identification of (and link to) the entity document, the workflow is readily characterized by all necessary information.

Pos 0 contains either the triggering External Activity 49a or a symbolic entry to indicate that the workflow has been initiated by an Internal Schedule; the Target Pos of this entry always points to >> 1, i.e., to the first real activity to be executed.

Pos 1 specifies the first activity as receiving the trigger event from Source Pos 0; after performing the specified activity, one or more messages 55b can be sent out to indicated Target Pos (for example, Target Pos 2 and 3 in the illustrated table 77 of FIG. 5b1), thus triggering execution of next activities in other positions.

The above mechanism continues (as illustrated at Pos 2 through Pos 11 in FIGS. 5b1 and 5b2 with external Activities 49b,c/external Roles 53b,c pairs and Work Activities 47b–47i/Business Role 43b–43i pairs and respective Business Messages 55c–55h) until the driving communication disappears completely from the operation under consideration. This can happen either by executing workflow closing activities which do not send any communication or by communicating to external surroundings and not receiving an immediate feedback. By the capability to send and receive multiple messages, the full flexibility of the workflow (including re-entry, looping and feedback) is clearly supported by the present invention system model diagram 13.

The necessity of a properly performed and formalized analysis of information flows in a business operation has been emphasized previously. The present invention presents a mathematically consistent analysis approach and demonstrates how to formalize the collected communication data in a set of related diagonal process-message matrices 71a–71d (FIGS. 4a–4d).

In a traditional diagonal process-message matrix, a table is used to record message exchange (e.g., flow of information, data, material or money) between various functional entities (e.g., organizational or functional units). The table contains the functional entities as annotated blocks in its diagonal cells 75a,b,c,d,e and places the exchanged messages 73 in the corresponding intersecting cell in such a way that the message flow propagates in the clockwise direction. Therefore, the inputs to a particular block 75 on the diagonal are shown in cells above and below this block 75 while the outputs are in the cells left and right of this block 75.

The present invention employs a modified process-message matrix 71 of FIGS. 4a–4d which is based on the above mapping convention but extended by three important features:

The process-message matrix 71 may contain a hierarchy of lower level matrices to support an optional hierarchy of functional entities; the matrices may be nested to any depth.

The process-message matrix 71 and any of its submatrices has specific areas at its periphery which represent interfaces to all other functional entities not contained in the immediate matrix and these areas display all input and output messages; the functional entities of the surroundings communicating with the current matrix are recorded in an associated Extern-interface matrix and/or Intern-interface matrix (discussed below).

The creation, viewing, modification and formatted printing of the process-message matrices 71 is supported by a graphics application based on, for example, Microsoft Excel in one embodiment of the present invention. In the preferred embodiment, the viewing of process-message matrices 71 is supported by a Matrix View module 95 (discussed below and shown in FIG. 2).

In the context of the system model diagram 13 of FIG. 3, the above hierarchy of functional entities becomes the hierarchy starting with the Business System entity 51 composed of (an optional hierarchy of) Business Process entities 41 which, in turn, are composed of Business Role entities 43. The message exchange from the process-message matrices 71 clearly corresponds to the flow of Business Message entities 55. The lowest operation level (i.e., level of Work Activity 47 at which the Business Message 55 is actually communicated) is suppressed at first in the process-message matrix 71, and the Work Activity 47 is considered as a kind of fine structure of its executing Business Role 43 during the information flow analysis. This initial simplification speeds up the analysis phase, while postponing the detail specification of a particular Work Activity 47 associated with the Business Message 55 to the later stage, when providing more specific details and entering data into the relational database 17. Consequently, in the process-message matrices 71 of the present invention, the communication appears as exchange among Business Role 43 and/or Business Process 41 entities within a Business System 51.

The most prominent advantage of the invention process message matrix 71 formalism is the ability to analyze and document even a very complex Business System 51 in a formally consistent manner. The business operation analyst (e.g., administrator-user) using the matrix-based information flow analysis may establish his/her momentary viewing focus of the Business System 51 by selecting the Business Process 41 of interest and still be able to see all incoming and outgoing communication immediately. In particular, the invention matrix 71 readily allows one to:

decompose the target Business System 51 into a consistent hierarchy of Business Process 41 and Business Role 43 entities;

record the exchange of Business Message entities 55 as perceived by the responsibles (i.e., the domain experts/managers responsible) for each respective Business Process 41;

reconcile differing perceptions of the communication among the responsible parties and achieve full continuity and consistency of the message exchange;

point out obvious communication deficiencies and suggest improvement and optimization measures; and promote encapsulation and autonomy for each Business Process 41 by minimizing the amount of interface communication.

With reference to FIGS. 4a–4d and continuing with the hypothetical business operation example "High School Happenings", each Business System 51 with its full communication is represented by a linked set of process-message matrices 71a–71d (which can be examined on-line as spreadsheet application program tables or the like, or printed out using the standard print function). As illustrated in FIG. 4, Business Message labels 73a are located inside the matrix frame 94 of the Business System 51 or Business Process 41 to describe communication within this entity. Those messages 73b located outside the frame 94 describe communication between the subject entity and entities in the surroundings.

The symbolic blocks 81, 83 (FIGS. 4a and 4b) in the lower right and upper left corners, respectively, of the process-message matrix 71 represent its diagonal extensions for external and internal communication respectively (i.e., to extern-interface matrix and intern-interface matrix). An exact correspondence for the input/output communication between the matrix and its extensions must be maintained. The details of the lower right symbolic block 81 in the top level matrix 71a are specified by the diagonal extensions for all component Business Process entities 41a–41e of this Business System 51. For the top level matrix 71a, there is no communication with the upper left symbolic block 83 since the process-message matrix for the Business System entity 51 already describes the top level entry.

Thus, the following considerations lead to a consistent formalization of the information flow analysis of the present invention.

Figure 4A:
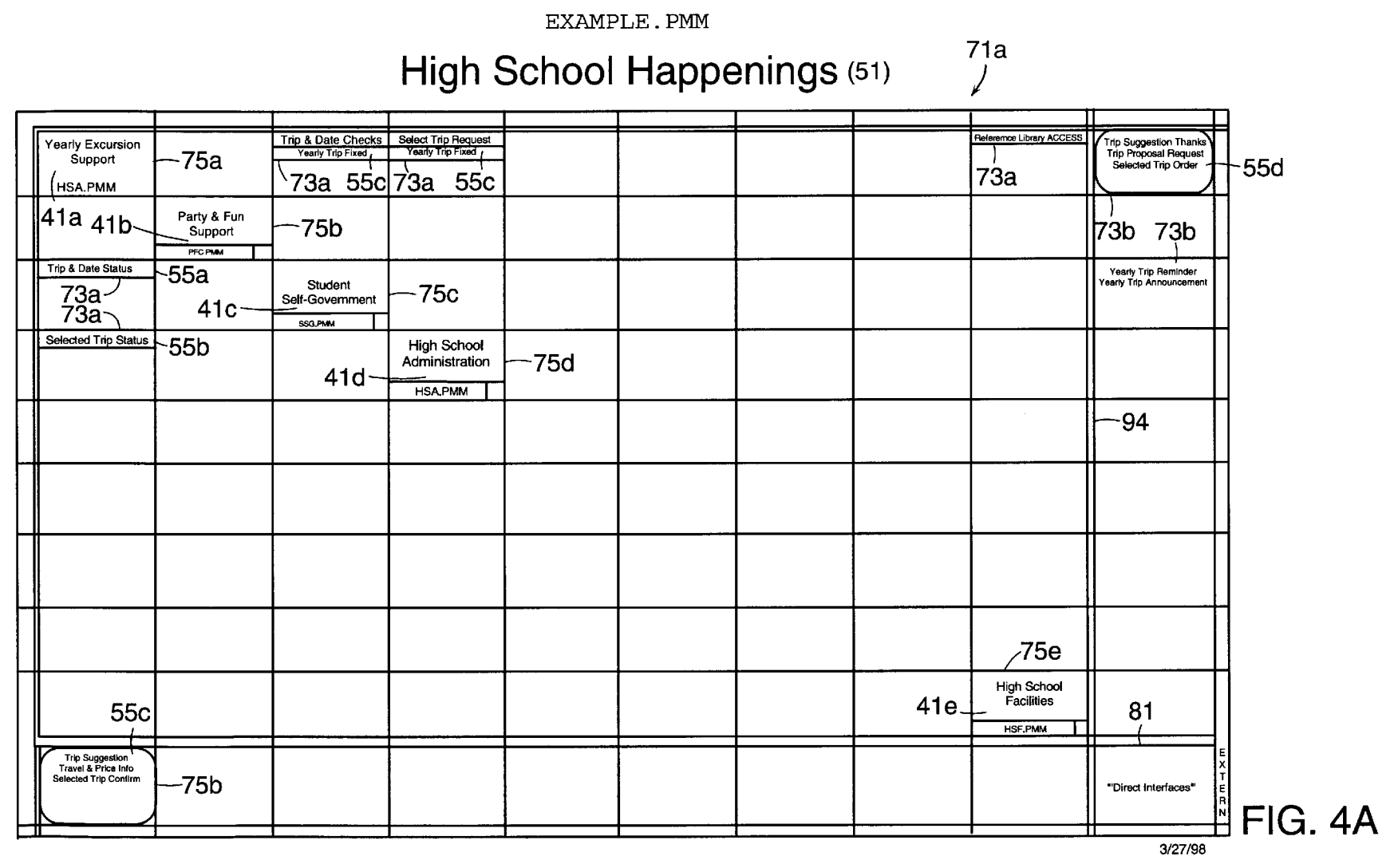

After defining the scope of the target business operation and assigning a name to the Business System entity 51 ("High School Happenings" in the illustrated example), the Business System entity 51 is structured into its component Business Process entities 41a–41e (i.e., Yearly Excursion Support, Party & Fun Support, etc.) All of these entities 41a–e are shown in the top-level matrix 71a (file EXAMPLE.PMM) as illustrated in FIG. 4a. The communication messages shown in this matrix 71a will be discussed later as the last item of this methodology discussion.

Since there is no further hierarchy of (sub)processes assumed, each of the Business Process entities 41a–41e is decomposed into its supporting Business Role entities 43. In the illustrated example case of "Yearly Excursion Support" 41a, the supporting Business Role entities are Trip Coordinator 43a and Trip Proposal Review Board 43b. The corresponding matrix 71b (file YES.PMM) to "Yearly Excursion Support" Business Process entity 41a is displayed for example, in MS Excel application 20, by double clicking on the square in the lower right corner of the block 75a on the diagonal representing Business Process entity 41a (Yearly Excursion Support) in top level matrix 71a, FIG. 4a. Similarly, the decomposition for all other processes 41b–41e may be seen in respective corresponding matrices (files P&FS.PMM, SSG.PMM, HSA.PMM, HSF.PMM).

Continuing the analysis on Yearly Excursion Support (file YES.PMM) Business Process entity 41a, next examine the participating Business Message entities 55 inside and outside of this Business Process 41a of interest. Such is shown in FIG. 4b.

Figure 4B:
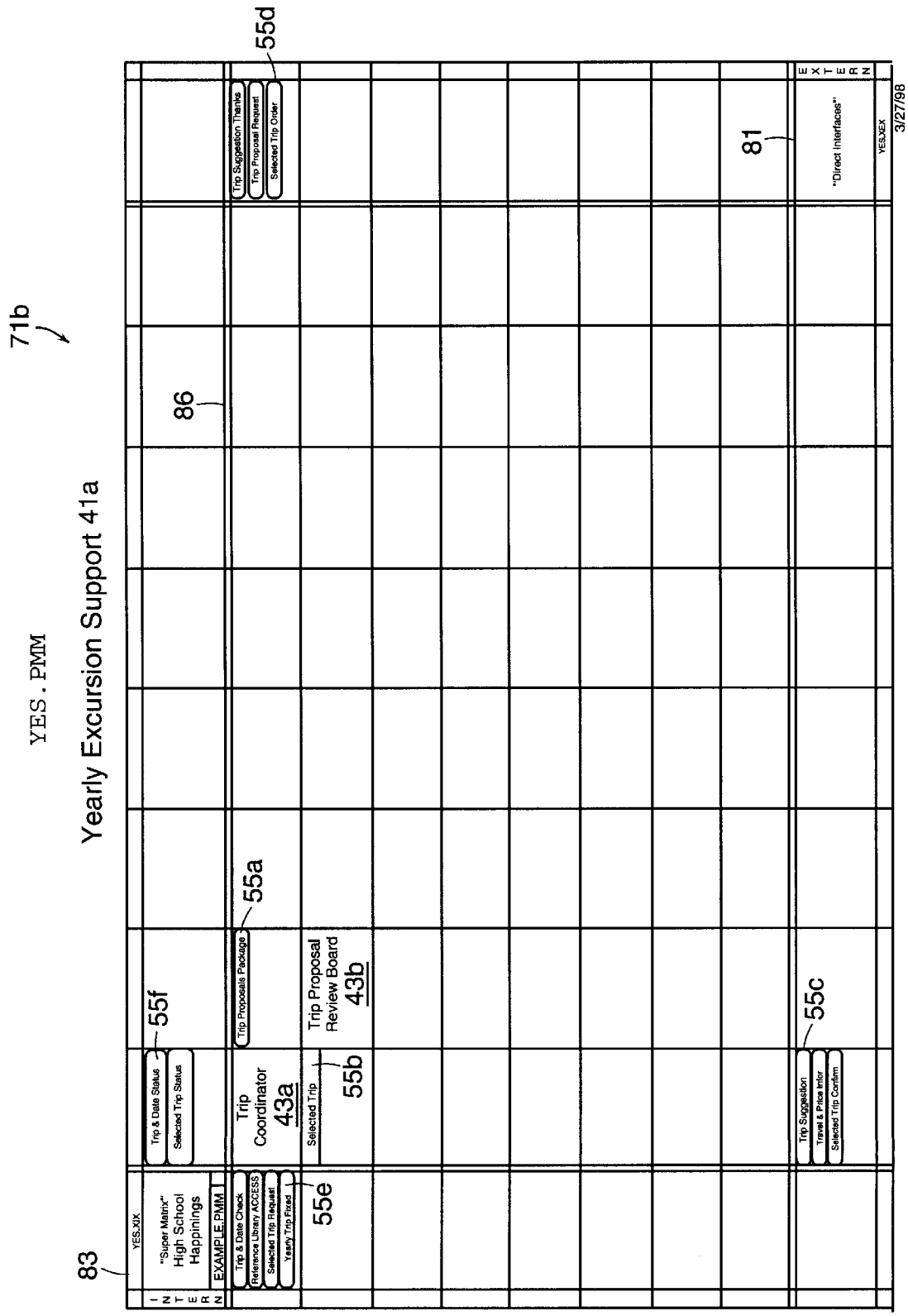

Staying within Yearly Excursion Support Business Process 41a (represented by the matrix 71b area inside the double line frame 86 in FIG. 4b), a Business Message entity 55a (Trip Proposals Package) describes a communication from one Business Role entity 43a (Trip Coordinator) to another 43b (Trip Proposal Review Board), and therefore resides in the upper right (i.e., clockwise) intersecting cell of the diagonal blocks representing these entities 43a, 43b. Another Business Message 55b (Selected Trip) indicates the response to the communication.

External communication from/to the external Role entities 53 which do not belong to the Business System 51 under consideration (i.e., they are not within the scope of the target business operation) is represented by messages coming from/going to a symbolic block 81 *Direct Interfaces* in the lower right corner of the matrix 71b with current focus (file YES.PMM).

For example, (i) an input Business Message "Trip Suggestion" 55c is coming from *Direct Interfaces* and is addressed to Trip Coordinator Business Role 43a, and (ii) an output Business Message "Selected Trip Order" 55d originates from Trip Coordinator Business Role 43a and is going to *Direct Interfaces* 81. Consequently, the matrix area below the double line frame 86 represents the External input interface and the matrix area on the right of the double line frame 86 represents the External output interface of the matrix 71b (FIG. 4b).

Figure 4C:
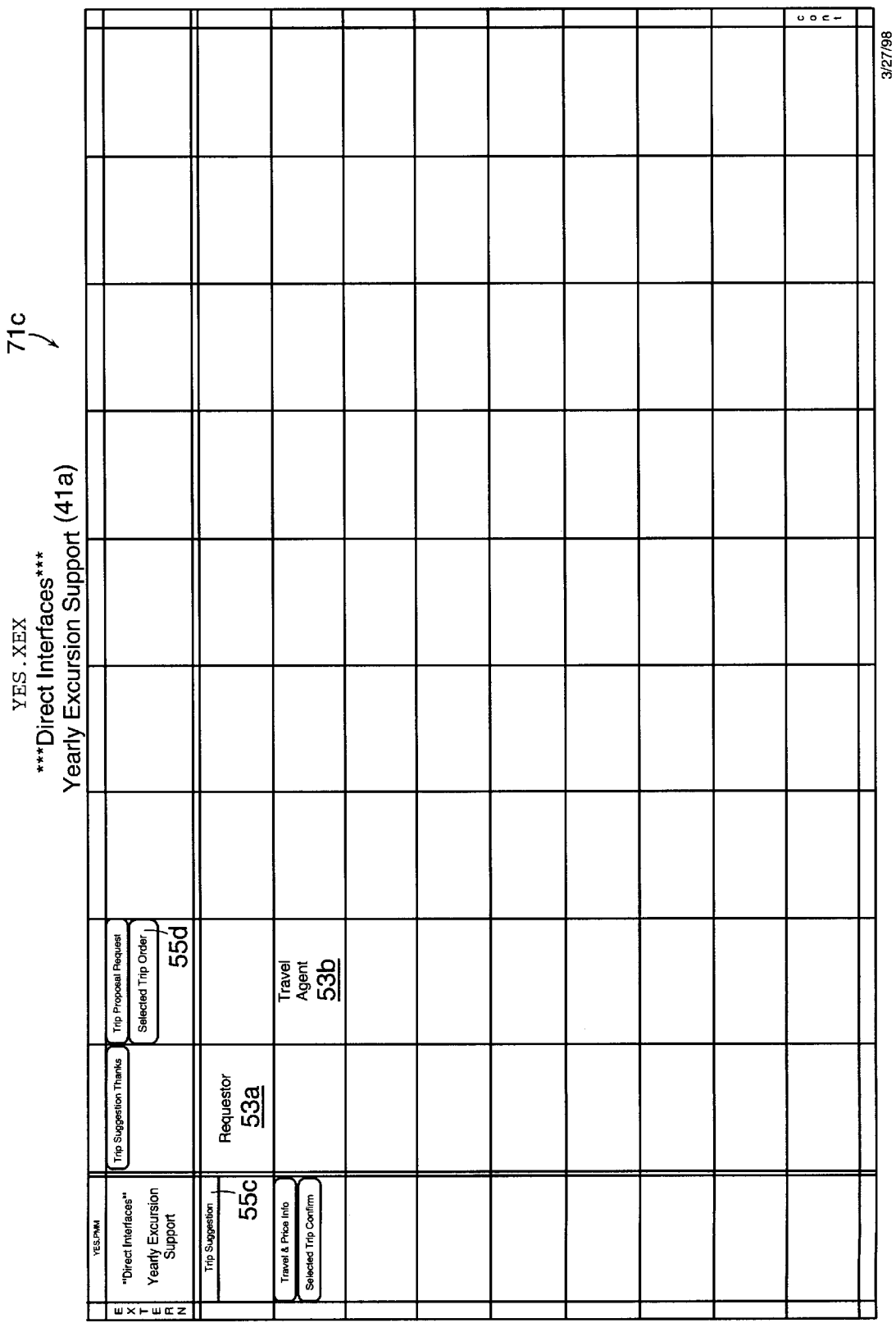

The details of the symbolic block *Direct Interfaces* 81 (in FIG. 4b) are shown in an external interface matrix 71c (file YES.XEX) which is displayed in MS Excel application by double clicking on the square at the lower right corner of the symbolic block 81 (to the right of the YES.XEX entry) representing *Direct Interfaces* in matrix 71b. FIG. 4c illustrates the resulting view/display of external interface matrix 71c (file YES.XEX).

In the example, the Business Message "Trip Suggestion" 55c is sent by Requestor (external Role) 53a in FIG. 4c, and the Business Message "Selected Trip Order" 55d is received by Travel Agent (external Role) 53b. The return from matrix 71c back to the initial Business Process 41a "Yearly Excursion Support" matrix 71b (file YES.PMM) is accomplished by either closing the *Direct Interfaces* matrix (file YES.XEX) 71c, or by double clicking on the square at the upper-, left-most corner of the display (left of YES.PMM entry in matrix 71c) in FIG. 4c.

Referring back to FIG. 4b, internal communication from/to the Business Role entities 43 which do belong to the Business System 51 under consideration (i.e., they are within the scope of the target business operation) is represented by messages 55 coming from/going to the symbolic block *Super Matrix* in the upper left corner 83 of the matrix 71b with current focus (file YES.PMM).

For example, input Business Message "Trip & Date Status" 55f is coming from *Super Matrix* and is addressed to Trip Coordinator 43a. Output Business Message "Yearly Trip Fixed" 55e originates from Trip Coordinator 43a and is going to *Super Matrix* 83. Consequently, the matrix area above the double line frame 86 represents the Internal input interface and the matrix area on the left of the double line frame 86 represents the Internal output interface of the matrix 71b.

The details of the symbolic block *Super Matrix* 83 are shown in an internal interface matrix 71d (file YES.XIX) which is displayed, for example, in MS Excel application by double clicking on the square at the upper left corner of the symbolic block 83 (left of the YES.XIX entry) representing *Super Matrix* in matrix 71b. The resulting internal interface matrix 71d is illustrated in FIG. 4d.

Figure 4D:
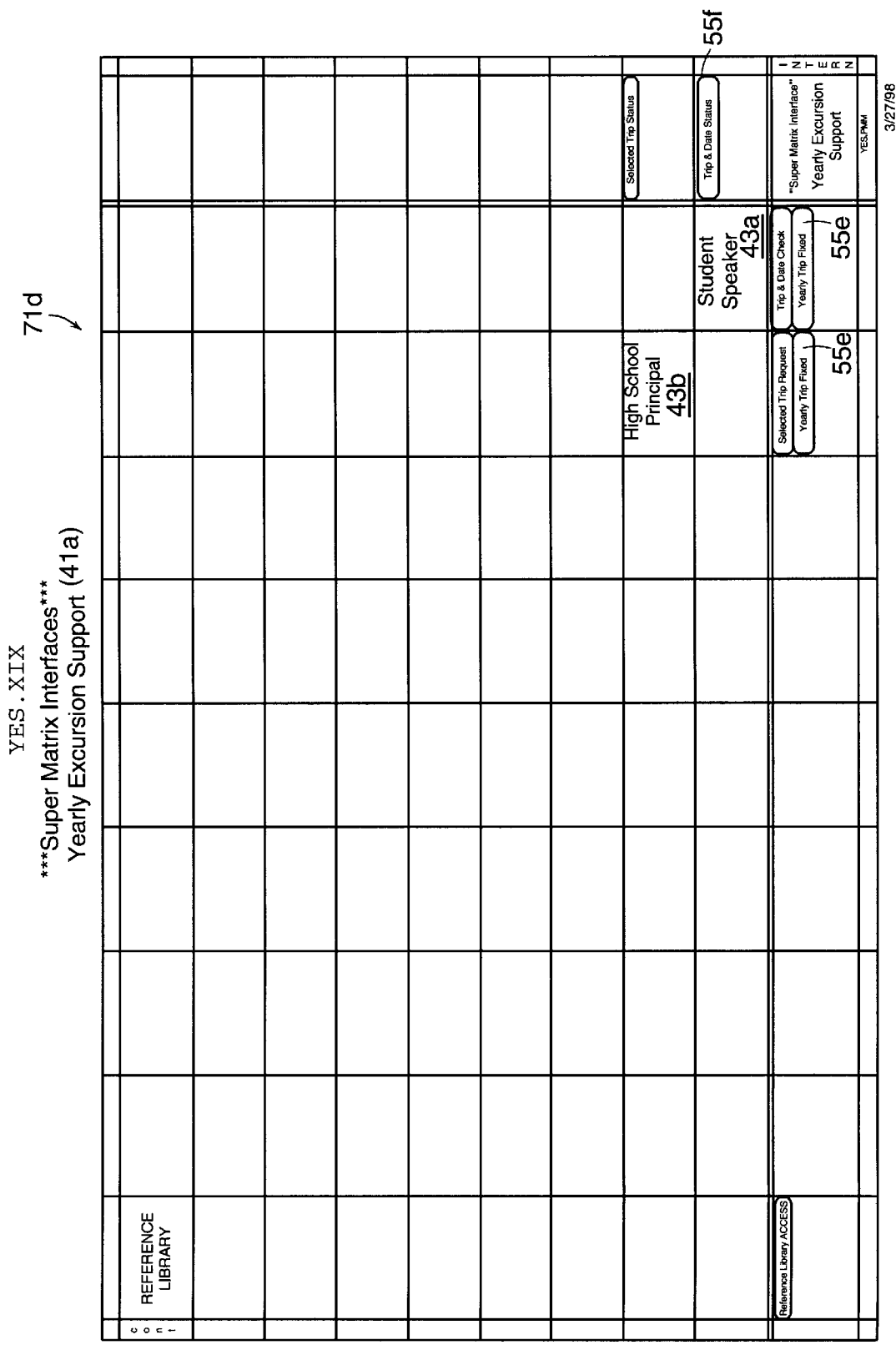

In the example, the Business Message Trip & Date Status 55f in FIG. 4d is sent by Student Speaker (Business Role entity) 43a, and the Business Message Yearly Trip Fixed 55e is received by Student Speaker 43a and High School Principal 43b. The return from matrix 71d back to initial Business Process 41a Yearly Excursion Support matrix 71b of FIG. 4b (file YES.PMM) is accomplished by either closing the *Super Matrix* matrix 71d (file YES.XIX) or by double clicking on the square at the lower-, right-most corner of the display (right of the YES.PMM entry) in FIG. 4d.

The return back from the matrix 71b (FIG. 4b) to the originating Business System 51 High School Happenings matrix 71a (file EXAMPLE.PMM) of FIG. 4a is accomplished by closing either the Yearly Excursion Support matrix 71b (file YES.PMM) or by double clicking on the square in the upper left corner of the symbolic block *Super Matrix* 83 (to the right of the EXAMPLE.PMM entry) in matrix 71b (FIG. 4b).

Now, let's move the analysis focus to the next Business Process 41 (for example Student Self-Government (file SSG.PMM) in FIG. 4a), and apply the same considerations as was done above in the discussion of Yearly Excursion Support Business Process 41a. That is, repeat similarly for all remaining Business Process entities 41b,c,d and e in the subject Business System 51 of FIG. 4a.

Check if the same perception of input/output communication exists among all interacting processes 41 and, in case of discrepancies, perform reconciliation including redesign of all obvious communication breaks.

The complete communication picture of the target business operation mapped into the Business System 51 (for example, High School Happenings (file EXAMPLE.PMM)) is obtained as a systematic roll-up of all messages 55 from the lower level(s). As illustrated in FIG. 4a, the communication among the Business Process entities 41 of the Business System 51 is shown by the messages (with labels at 73a) inside the matrix 71a double line frame 94. All external —input to a particular Business Process 41 is accumulated and indicated in the corresponding cell at the bottom outside the matrix frame 94 and, similarly, all external output at the right outside the matrix frame 94 using business message labels 73b.

Software Support

The software architecture of one embodiment of the present invention 24 is illustrated in FIG. 2 and described previously. The following describes each component of the architecture along with the work steps performed by the administrator-user to prepare the environment for use, fill the database 17 with business operation data, release raw data from the database 17 and compose the resulting printable documentation in the preferred embodiment.

From the viewpoint of the documentation modeler/administrator, the Relational BSD Environment of the present invention is designed as a single-user, full-access suite of PC-based standard tools, integrated and customized by some additional software 24. The invention software 24 is utilized along with MS Windows (or Windows 95, Windows NT), MS Access 15, MS Word 19, MS Help Compiler 39, and MS WinHelp 89 applications in the preferred embodiment.

From the viewpoint of the documentation end user, the Relational BSD Environment 24 is a multi-user, view/print-only, network-capable interface to the business related information based on the hypertext display provided by MS Windows (or Windows 95, Windows NT) standard WinHelp application 89 which can be started from a PC Desktop, either by clicking a Desktop icon or via a World Wide Web browser page.

As described previously, the administrator-user gathers and enters into database 17 and database 17 provides to word processor 19 working (or "raw") data indicative of the company/enterprise activities, operations, personnel, work/communication flow, etc. Thus system 24 provides Data Entry 93, Matrix View 95, Release 97 and Consistency Check 99 modules for appropriately processing the raw data. More accurately, this raw data-related functionality (data entry/update 93, storage, presentation 95, checking 99, extraction 97) is provided by the database application program 15 connected or cooperating with the Business System Model database 17. In the preferred embodiment Microsoft Access is utilized as the database application 15.

The Data Entry module 93 is a high functionality administrator's interface implemented in close correspondence to the Business System Model diagram 13 of FIG. 3. The manipulation of data (entity attributes values with entity relationships) is performed from the vantage point of a particular model entity, with consistency and relational integrity of data being automatically checked in the background. A given relationship may be set from either end. For example, the relationship between a Business Role 43 and a Work Activity 47 may be established either by setting the "executor of" in Business Role entity 43 or by setting that attribute field to indicate "executed by" in Work Activity entity 47 and corresponding database 17 entry/record.

The Matrix View module 95 is a view-only graphics interface. Matrix view module 95 statically presents the database communication data (exchange of Business Message entities 55) in the form of a process-message matrix 71 as discussed above in FIG. 4. The information resulting from the initial information flow analysis of a business operation is entered into the database 17, and Matrix View module 95 enables the information to be formally displayed in a consistent set of process-message matrices 71. These displays may be used as the feedback mechanism to the original source of information for cross checks and corrections. Alternatively a graphics application (e.g. Microsoft Excel) may be employed to provide the display and printing capability of the Matrix View module 95. Other applications programs are suitable.

The Consistency Check module 99 provides information flow continuity checks by analyzing the database 17 communication data. To that end, Consistency Check module 99 facilitates and hastens the information flow analysis by pointing out possible inconsistencies, prior to calculation of the workflow.

The Minor/Major Release module 97 controls the raw data release from database 17. In particular, Release module 97 assigns a release identifier and a time stamp to subject data from database 17. The Release module 97 also extracts all necessary data from the database 17. In a Major Release, data for a full documentation set is extracted, even if no changes occurred since the last release. The extracted data includes setup definitions of the environment, e.g., language definition files. In a Minor Release, only data for changed documents are extracted. The document composer 85 (see below) recognizes the type of release and acts accordingly.

In other embodiments, present invention system 24 also includes a Matrix Simulator 80 and a Workflow Parametizer 82. The Matrix Simulator 80 is implemented using database application program 15. The Matrix Simulator 80 is a view-only graphics interface which dynamically presents exchange of Business Message entities 55, in the form of message symbols moving in process-message matrices 71. Thus the matrix simulator 80 simulates the message triggered workflow for a given Workflow Procedure 45.

The Workflow Parametizer 82 is an interface application which uses the available database information to set up a real-time workflow controller.

The environment setup after a customization and the periodic document composition from the released raw data are supported by two components implemented as MS Word applications 19. These two components are the Environment Maintainer 84 and the Document Composer 85. These two components 84, 85 support environment setup after a customization and the periodic document composition from the released raw data as follows.

The Environment Maintainer 84 is a program (module) checking the environment consistency and performing all necessary updates after any environment customization change. It is run on a new environment and after any later customization, before invoking the Document Composer 85.

The Document Composer 85 is a program (module) operating on raw data released from the database 17 and integrating it with the customized language of the environment in various document definition files to produce compilable files 28 and printable files 35. The Document Composer 85 generates a full documentation set after a major release and an incremental document set (containing only documents which have changed since the last release) after a Minor Release from Release Module 97. The printable files 35 (preferably in rich text format, *.RTF) are ready for printing through the word processing application 19 print function, while the compilable files 28 provide input to the Document Compiler 87 (as discussed below).

The remaining components of the system 24 architecture illustrated in FIG. 2 are implemented in dependence on the existing computer and network infrastructure. In particular, the Document Compiler 87 in the preferred embodiment is a Microsoft DOS batch program controlling execution of the Microsoft Help Compiler 39 which is part of various Microsoft development packages (e.g., Microsoft Visual Basic). The Document Compiler 87 operates on compilable files 28 from Document Composer 85 and generates a set of interlinked hypertext files (help file format, *.HLP), which may be displayed by the standard Microsoft WinHelp application 89.

The WinHelp application 89 is a standard Microsoft Win Help application as supplied with any Microsoft Windows installation. This application 89 provides the end-user with the view and print capability for topics (by Title attribute) from the hypertext documentation.

The printer component 37 is any local or network printer accessible from the computer system 21. The generated set of company documents/hypertext documents from the Document Composer 85 and Document Compiler 87 (via WinHelp application 89), respectively, serve as the input to printer component 37; due to the preferred embodiment being based on Microsoft Windows, a PostScript printer is employed.

In the preferred embodiment, two document collections (sets of company documents) are generated and provided by the present invention system 24. The first documentation collection is a Quality Management Handbook 90 which is a top level quality related document that provides the general overview of the quality system in context of the company. The Handbook 90 also addresses the quality elements specified in the ISO9000 standard. The Handbook 90 typically does not contain (sensitive) detailed information about the business operation/company since it is also intended for external customers and general public. The Handbook 90 further points to business specific details by cross-referencing various topics in the second document collection, namely the Business System Documentation 92.

The Business System Documentation 92 is the main deliverable of the present invention system 24. The Business System Documentation 92 is a detailed, event-driven, information-flow-oriented description of the business operation of the company according to the Business System Model 13 described above in FIG. 3.

Both documentation collections 90, 92 are available as hypertext (on-line documentation) and as hard copy (printed documents). The hypertext documentation is organized in interlinked topics with a high level of granularity. A printed topic is considered to be a work copy 88 only, which has been generated by the end user and is not subject to the document control procedures. On the other hand, the hard copy documents obtained from the printable documentation files with restricted access are considered to be an authorized copy since they are subject to the document control procedures. In the preferred embodiment, both types of documentation (on-line and printed) are clearly distinguishable by a header (with the logo of business operation and other identifiers) and a footer (with the page number and other identifiers) which appear on the authorized copy only.

A third documentation set which is closely associated with the above collections 90, 92 and which may also be made available by the present invention is a process-message matrix 71 containing formalized results of the underlying information flow analysis. This documentation set consists of interlinked spreadsheet application program tables (process-message matrices 71) and emphasizes the communication exchange interfaces.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims.

The above-described system model 13 definition and the resulting documentation sets 90, 92 are adaptable to specific customization requirements for the environment. In particular, the present invention Business System Model 13 enables the following modifications for different applications:

(1) Language customization to a national or company specific language may be easily performed by translating the terms and definitions in one single place. The propagation of these changes into all documents is performed automatically through the Environment Maintainer Module 84 (FIG. 2).

(2) Entity data contents customization, such as adding or removing an attribute in an entity, requires a minor table definition change in the relational database 17 and a minor modification of the document definition file. Attachments may be added or removed by a minor modification of the document definition file.

(3) Model definition structure customization (by adding or removing an entity in the Business System Model 13) requires: (a) some structural changes in a few places of the relational database 17 and software 24, (b) creation or deletion of the document definition file, and (c) a minor change in the compilation batch file.

Further, the potential demonstrated in the present invention method and apparatus to a broad range of rather complex as well as fairly simple applications, includes for example:

documentation of business operation for Quality System (including elements of ISO 9000), the "preferred embodiment";

documentation of business operation in a reduced customized approach (e.g., without Quality System elements);

documentation of individual business processes (at arbitrary level of detail), with or without database and/or hypertext steps;

documentation of networked computer/application systems and their information/data interface communication, with or without database and/or hypertext steps (e.g., to support documentation required by the Data Security Act);

documentation based on arbitrary structured collections satisfying the classification criteria, with or without database and/or hypertext steps;

etc.

The major criteria for the present invention approach's applicability is that the document collection is able to be categorized and mapped into a set of (possibly) interrelated entities which are charted in an entity-relationship diagram. For the practical applicability, it is irrelevant if some dynamic exchange of entities (like Work Activities exchanging Business Messages) is part of the entity-relationship diagram or not; this optional exchange of entities just results in a dependent dynamic (calculated) entity (like Workflow Procedure 45); the database and/or hypertext steps may be performed with or without dynamic components.

In sum, due to utilization of the relational business system database environment of the present invention which is formed of a generic Business System Model 12, automated PC-based supporting tools (illustrated in FIG. 2) and a consistent data analysis methodology (discussed above with reference to FIGS. 3, 4 and 5), the task of collecting, formalizing and maintaining the relevant information to establish the desired documentation (e.g., Business System Documentation) becomes a standardized and systematic effort. Consequently, the manpower and time needed for creation and maintenance of the resulting documentation is greatly decreased, and at the same time the documentation quality expressed in terms of its user friendliness, consistency, modularity and level of usable detail substantially increased. A fully consistent release of the updated documentation may be performed as often as necessary, thus satisfying the need for fast propagation of operational and/or organizational changes into daily operation via documented processes.

As mentioned above in the preferred embodiment, the end user may access the on-line documentation from a PC Desktop, either by clicking a Desktop icon or via a web browser page. A navigation interface leads in a structured way to modular interlinked hypertext documents containing links for display of pop-up description windows or further jumps to related topics. In this way, the end user has direct access to information supporting the daily work, such as reference documents, various checklists, standard forms or description of activities including detailed step by step work instructions. Since the quality-related work is an integral part of the business operation, the same kind of support is available to people (end users) responsible for quality management.

Further, the foregoing description of the preferred embodiment mentions Microsoft applications. However, other synonymous spreadsheet, database and word processing applications and operating systems are suitable. Likewise, not only HLP hypertext format produced by illustrated MS Help Compiler can be generated by the present invention, but the present invention may also be employed to make programs (i.e., Document Compilers) for other (generic) hypertext formats (e.g., HTML) to become native on the World Wide Web.

Also, the Matrix View 95, Consistency Check 99, Matrix Simulator 80 and Workflow Parametizer 82 modules of FIG. 2 are optional (not requisite) parts/features of the invention software 24. It is understood that other implementations of the present invention are suitable and in the purview of one skilled in the art given the foregoing description.

What is claimed is:

1. A method for generating and maintaining a structured collection of documents, the method comprising the steps of:
   providing a conceptual model of a desired document system in terms of its interdependent entities, the model including (i) a plurality of entities of different entity classes, and (ii) relationships among the entities, said entities and relationships being charted in an entity-relationship diagram;
   categorizing each document in the structured collection of documents into one of the entity classes from the conceptual model, such that each document is an instance of a respective entity class;
   based on the entity-relationship diagram, automatically generating and updating each document according to respective entity class, such that the structured collection of documents is automatically generated and maintained;
   forming a relational database based on the conceptual model and entity-relationship diagram, such that the database holds actual information contents needed to automatically generate and format each document and hence the structured collection of documents;
   the step of generating and updating includes automatically generating the documents in complete formatted printable and compilable form from the contents stored in the database, enabling post processing into an on-line hypertext documentation; and
   wherein the step of providing a conceptual model includes charting and analyzing dynamic exchange among entities in a hierarchy of process-message matrices.

2. A method as claimed in claim 1 wherein the step of generating and updating further includes mapping relationships between the entities implemented in the relational database into hypertext links between the documents in the hypertext documentation, the relational database providing a sequence of links to automatically propagate a change in each affected document upon an administrator-user entering a change in the relational database.

3. A method as claimed in claim 2 wherein the step of providing a conceptual model provides a Business System Model having business related entities, such that the entity-relationship diagram charts relationships among the business related entities; and
   the step of generating includes automatically creating, maintaining and distributing operation-related, management-related and quality-related documents as the structured collection of documents.

4. A method for generating and maintaining a structured collection of documents, the method comprising the steps of:
   providing a conceptual model of a desired document system in terms of its interdependent entities, the model including (i) a plurality of entities of different entity classes, and (ii) relationships among the entities, said entities and relationships being charted in an entity-relationship diagram;
   categorizing each document in the structured collection of documents into one of the entity classes from the conceptual model, such that each document is an instance of a respective entity class;
   based on the entity-relationship diagram, automatically generating and updating each document according to respective entity class, such that the structured collection of documents is automatically generated and maintained;
   forming a relational database based on the conceptual model and entity-relationship diagram, such that the database holds actual information contents needed to automatically generate and format each document and hence the structured collection of documents; and
   the step of generating and updating includes automatically generating the documents in complete formatted printable and compilable form from the contents held in the database, enabling post processing into an on-line hypertext documentation.

5. A method as claimed in claim 4 wherein the step of generating and updating further includes mapping relationships between the entities implemented in the relational database into links between the documents in the hypertext documentation, the relational database providing a sequence of links to propagate a change in each affected document upon an administrator-user entering a change in the relational database.

6. A method as claimed in claim 4 wherein the steps are performed in a computer system having a working memory for executing programs such that:
   the step of forming a relational database includes employing a database application program executed by the computer system in working memory; and
   the step of generating each document includes executing a word processing application program by the computer system in working memory.

7. In a computer system, computer apparatus for generating and maintaining a structured collection of documents from a conceptual model of a desired document system, the conceptual model including (i) a plurality of interdependent entities and (ii) relationships among the entities, the computer apparatus comprising:
   a source for indicating (a) the relationships among the entities in the conceptual model, and (b) entity class, from the conceptual model, of each document in the structured collection of documents, such that each document is an instance of a respective entity class;
   generation and maintenance means responsive to the source for automatically generating and updating each document according to respective entity class and the relationships indicated among respective entities in the source; and
   wherein the source includes a relational database, the database holding (i) indications of the entities, (ii)

indications of the relationships among the entities, and (iii) document contents with respect to the entities, such that the generation and maintenance means is able to automatically generate complete formatted documents as the structured collection of documents, in at least one of printable and compilable form.

8. Computer apparatus as claimed in claim 7 further comprising an automatic hypertext generator coupled to the generation and maintenance means, said generator mapping relationships between the entities within the relational database to hyperlinks between related documents enabling automatic hypertext generation in the structured collection of documents.

9. Computer apparatus as claimed in claim 8 wherein the modeled system is a business system and the structured collection of documents includes operation-related, management-related and quality-related documents.

10. Computer apparatus as claimed in claim 7 wherein:
   a database application program is executed in working memory of the computer system to form the relational database; and
   the generation and maintenance means employs a word processor for generating the documents.

11. A method for generating and maintaining a structured collection of documents, the method comprising the steps of:
   providing a conceptual model of a desired document system in terms of its interdependent entities, the model including (i) a plurality of entities of different entity classes, and (ii) relationships among the entities, said entities and relationships being charted in an entity-relationship diagram, including charting and analyzing dynamic exchange among the entities in a hierarchy of process-message matrices;
   categorizing each document in the structured collection of documents into one of the entity classes from the conceptual model, such that each document is an instance of a respective entity class;
   forming a relational database based on the conceptual model and entity-relationship diagram, such that the database holds actual information contents needed to automatically generate and format each document and hence the structured collection of documents; and
   based on the entity-relationship diagram, automatically generating and updating each document according to respective entity class, such that the structured collection of documents is automatically generated and maintained, including automatically generating the documents in complete formatted printable and compilable form from the contents stored in the database, enabling post processing into an on-line hypertext documentation, and further including mapping relationships between the entities implemented in the relational database into hypertext links between the documents in the hypertext documentation, the relational database providing a sequence of links to automatically propagate a change in each affected document upon an administrator-user entering a change in the relational database.

12. A method as claimed in claim 11 wherein the step of providing a conceptual model provides a Business System Model having business related entities, such that the entity-relationship diagram charts relationships among the business related entities; and
   the step of generating includes automatically creating, maintaining and distributing operation-related, management-related and quality-related documents as the structured collection of documents.

13. A method for generating and maintaining a structured collection of documents, the method comprising the steps of:
   providing a conceptual model of a desired document system in terms of its interdependent entities, the model including (i) a plurality of entities of different entity classes, and (ii) relationships among the entities, said entities and relationships being charted in an entity-relationship diagram;
   categorizing each document in the structured collection of documents into one of the entity classes from the conceptual model, such that each document is an instance of a respective entity class;
   forming a relational database based on the conceptual model and entity-relationship diagram, such that the database holds actual information contents needed to automatically generate and format each document and hence the structured collection of documents; and
   based on the entity-relationship diagram, automatically generating and updating each document according to respective entity class, such that the structured collection of documents is automatically generated and maintained, including automatically generating the documents in complete formatted printable and compilable form from the contents held in the database, enabling post processing into an on-line hypertext documentation, and further including mapping relationships between the entities implemented in the relational database into links between the documents in the hypertext documentation, the relational database providing a sequence of links to propagate a change in each affected document upon an administrator-user entering a change in the relational database.

14. In a computer system, computer apparatus for generating and maintaining a structured collection of documents from a conceptual model of a desired document system, the conceptual model including (i) a plurality of interdependent entities and (ii) relationships among the entities, the computer apparatus comprising:
   a source for indicating (a) the relationships among the entities in the conceptual model, and (b) entity class, from the conceptual model, of each document in the structured collection of documents, such that each document is an instance of a respective entity class;
   generation and maintenance means responsive to the source for automatically generating and updating each document according to respective entity class and the relationships indicated among respective entities in the source;
   an automatic hypertext generator coupled to the generation and maintenance means, said generator mapping relationships between the entities within the relational database to hyperlinks between related documents enabling automatic hypertext generation in the structured collection of documents; and
   wherein the source includes a relational database, the database holding (i) indications of the entities, (ii) indications of the relationships among the entities, and (iii) document contents with respect to the entities, such that the generation and maintenance means is able to automatically generate complete formatted documents as the structured collection of documents, in at least one of printable and compilable form.

15. Computer apparatus as claimed in claim 14 wherein the modeled system is a business system and the structured collection of documents includes operation-related, management-related and quality-related documents.

16. In a computer system executing at least a database application program and a word processing application program in working memory, a computer method for generating and maintaining a structured collection of documents describing a business system, the method comprising the steps of:

executing the database application program in working memory to form a relational database to implement a conceptual model of the business system, the model including (a) business related entities and (b) relationships among the entities, the database holding indications of each entity and the relationships among the entities with respect to the business system, the business system formed of a hierarchy of business processes, each process having an exchange of message entities;

storing document contents in the database with respect to the entities as indicated in the database;

coupling the database to the word processing application program in a manner such that execution of the word processing application program in working memory automatically generates the structured collection of documents as updated and maintained throughout the database implementation of the model of the business system, such that the document contents include desired cross-references and are as recent as the indications in the database, such that the most up-to-date version of the structured collection of documents is generated; and forming matrices to chart dynamic exchange of message entities among the business related entities, the hierarchy being formed of an ordered set of matrices, there being a different matrix for each business process, each matrix (i) providing an indication of communication exchange of a message entity among other entities with respect to a respective business process, and (ii) having a succeeding matrix providing indications of exchanges of message entities among other entities with respect to another business process.

17. A method as claimed in claim 16 further comprising the steps of:

using the database, mapping interdependencies of the entities according to their relationships into interdependencies of the documents;

executing the word processing application program in working memory to automatically generate and insert hypertext references for linking interdependent documents to each other in the structured collection of documents based on said mapping, the word processing application program generating a collection of hyperlinked documents; and transmitting on-line the collection of hyperlinked documents on a network of computers upon generation thereof, such that the collection of hyperlinked documents transmitted on-line are viewable by a network user.

* * * * *